(No Model.)
R. S. CARR.
COMPOUND SEEDING MACHINE.
No. 304,074. Patented Aug. 26, 1884.
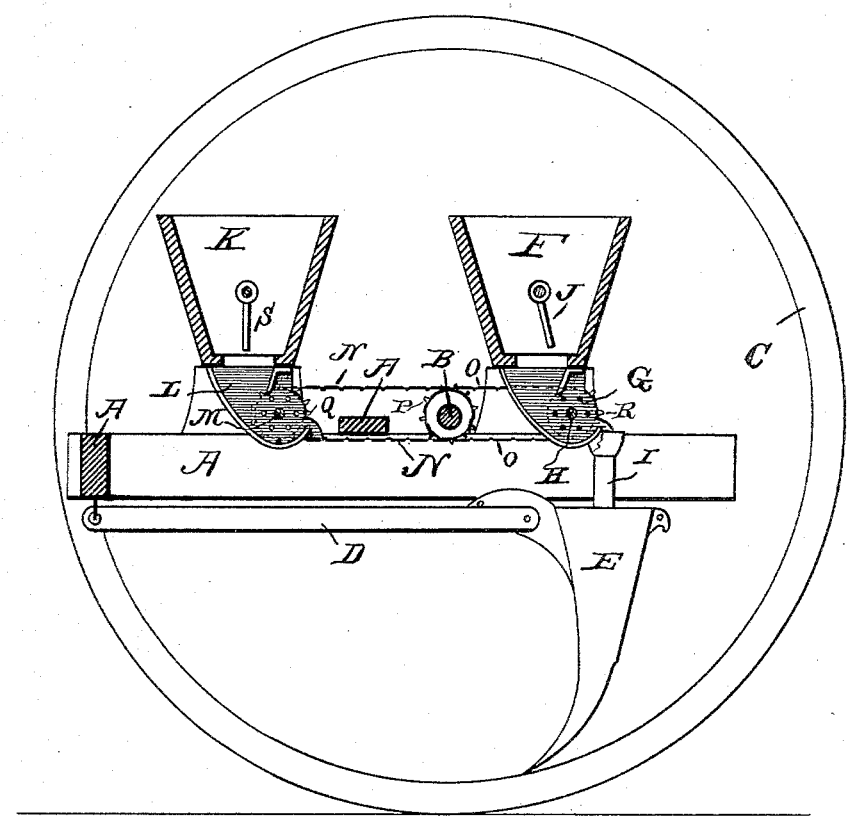
Witnesses:
W. A. Seward
A. Myers
Robert S. Carr Inventor
by James N. See Attorney

UNITED STATES PATENT OFFICE.

ROBERT S. CARR, OF HAMILTON, OHIO, ASSIGNOR TO JOHN W. SOHN, OF SAME PLACE.

COMPOUND SEEDING-MACHINE.

SPECIFICATION forming part of Letters Patent No. 304,074, dated August 26, 1884.

Application filed April 14, 1884. (No model.)

*To all whom it may concern:*

Be it known that I, ROBERT S. CARR, of Hamilton, Butler county, Ohio, have invented certain new and useful Improvements in Compound Seeding-Machines, of which the following is a specification.

This invention relates to a compound seeding-machine adapted for the simultaneous planting of two kinds of seed, or of seeding and fertilizing material, and of different simultaneous plans of delivery.

The invention will be readily understood from the following description, taken in connection with the accompanying drawing, which is a vertical transverse section of such parts of a seeding-machine as are necessary to fully illustrate my improvements.

In the drawing, A represents the framework of an ordinary seed-drill; B, the wheel-axle of the same; C, one of the wheels; D, the drag-bars; E, the drill-holes; F, the seed-box; G, a series of seed-distributers secured, as usual, below the seed-box; H, the usual shaft, driving the series of seed-distributers G; I, the usual flexible removable dropping-tubes, attached one to the nose of each of the seed-cups G and leading to the drill-holes; J, an agitator within the seed-box; K, a second seed-box similar to the first-mentioned one, and mounted in a similar manner forward of it; L, a series of seed-cups for the second seed-box and identical with the seed-cups G; M, a shaft driving the seed-cups of the forward seed-box; N, a driving-chain transmitting motion from the axle of the machine to the shaft of the forward seed-box; O, a similar chain transmitting motion to the shaft of the rear seed-box; P, sprocket-wheels upon the axle of the machine, adapted to give motion to the driving-chain; Q, a sprocket-wheel upon the shaft of the forward seed-box, by which that shaft is driven by its appropriate chain; R, a sprocket-wheel upon the shaft of the rear seed-box, by which it is driven by its appropriate chain, and S the agitator of the forward seed-box.

The seed-cups are provided with prong-wheel seeding devices—such, for instance, as is set forth in Letters Patent No. 274,460, granted to me March 27, 1883—that is, the seeding must be effected by a rotary series of prongs or wires arranged parallel with the axis of rotation of the series.

Grain placed in the rear seed-box may be drilled as usual, the forward seed-box being empty. With grain drilled from the rear seed-box fertilizing material may be sown broadcast from the front seed-box, the drill-hoes serving to harrow it in during the seeding operation. Grain may be sown broadcast from the front seed-box and fertilizer drilled at a depth below the surface of the soil. The drill-tubes I may be removed, and grain and fertilizer may be sown broadcast simultaneously, and harrowed in by the drill-hoes. The two seed-shafts H and M may be driven by chains or gearing, or any of the usual means, and they should be fitted to be stopped and started independent of each other by the usual engaging and disengaging devices. I prefer to provide each seed-box with the agitator J, which is of the usual construction, or, if desired, the two seed-boxes may be fitted to receive and give motion to a single agitator, which may be placed in whichever box the fertilizer material is planted from. The two seed-boxes should be identical in structure and in fitting, so that they may form parts of two ordinary seed-drills for ordinary work, and at the same time be capable of being compounded, as set forth for special work.

I claim as my invention—

In a compound seeding-machine, the combination, substantially as set forth, of two seed-boxes, each provided with a series of prong-wheel seeding devices, and with agitators and a series of seeding-hoes connected by detachable tubes with the seeding devices of one of said boxes.

ROBERT S. CARR.

Witnesses:
J. W. SEE,
W. A. SEWARD.